Patented Jan. 7, 1936

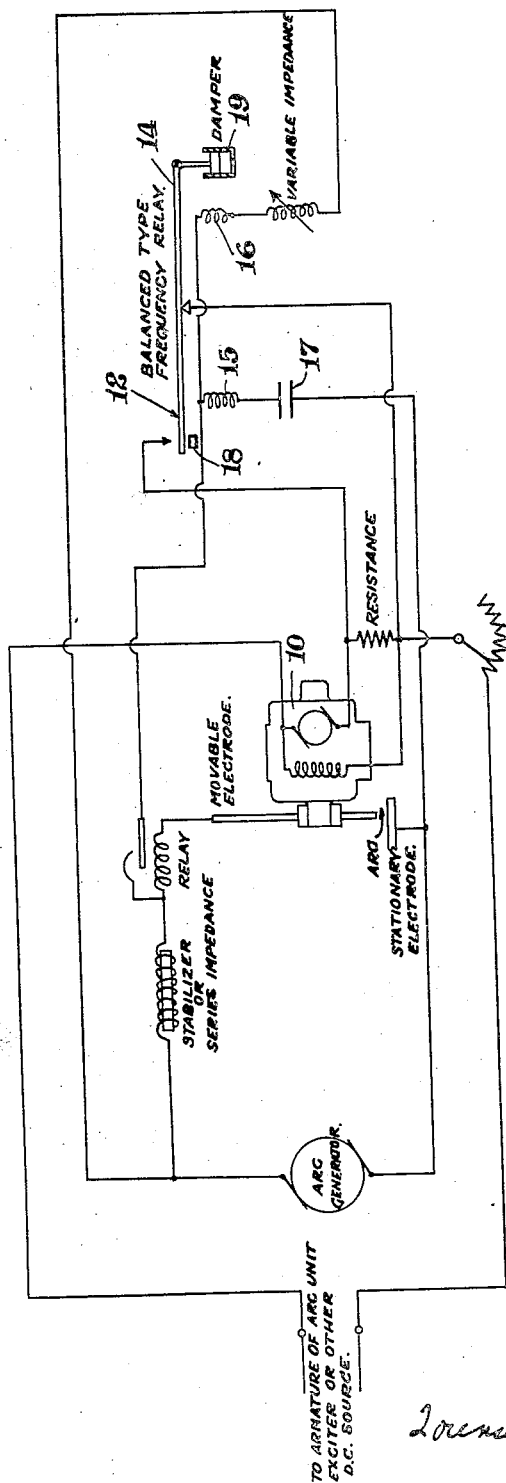

2,026,943

UNITED STATES PATENT OFFICE 2,026,943

ARC WELDING

Harry E. Kennedy, Maynard A. Rotermund, and Lloyd T. Jones, Berkeley, Calif., assignors to Union Carbide and Carbon Research Laboratories, Inc., a corporation of New York Application October 22, 1930, Serial No. 490,436

14 Claims. (Cl. 219—8)

This invention relates to arc welding and more particularly to a welding system for automatically controlling the arc length by utilizing certain characteristics of an arc welding circuit.

It has been well established by theory and practice that in arc welding the best results are obtained when the arc is maintained uniformly short. Therefore, in continuous welding the maintenance of a constant predetermined arc length by automatically controlling the advance of the electrode material results in welding of the highest character.

We accomplish such an automatic control through the medium of the frequency of fluctuations of a condition in the welding circuit which is set up by the globule movement between the electrodes. When the arc has been struck, the electrode material becomes molten at the lower end and in obedience to the laws of capillary attraction it forms a globule which continuously increases in diameter until it becomes of sufficient size to contact with the material being welded. When the globule has enlarged sufficiently to bridge or short circuit the arc stream, the arc voltage decreases to practically zero and the arc current increases to short circuit value, which short circuit condition exists until the globule is no longer in contact with the electrode material.

When the electrode material is maintained in close proximity to the material being welded, the globules cannot attain a very considerable size before bridging the arc stream and short circuiting the arc. Consequently the frequency of the depositions and consequent short circuits will increase as the arc is shortened and decrease as the arc is lengthened up to a point where the arc length is such that the globule deposits by gravity only and will not short circuit the arc stream.

The short circuits set up by the bridging of the arc stream by the globules reflect themselves throughout the entire welding circuit, and it is the principal object of the present invention to provide a welding system for automatically controlling the arc length through the medium of the frequency of the fluctuations of a condition in the welding circuit set up by the frequency of metallic deposition between the electrodes.

In the accompanying drawing, the single figure diagrammatically illustrates an electric welding system embodying our invention.

Reference being had to the accompanying drawing, 10 indicates an electric motor which includes a mechanical device which grips and feeds an endless strip of electrode material. The speed of the motor governs the movement of the electrode toward the work between which and the electrode the arc is struck. Such devices are well known in the art and it is therefore believed unnecessary to describe its construction in detail. It will suffice to point out that the circuit of this motor is influenced by the arc length so as to automatically regulate the feeding of the electrode and thereby maintain a constant arc length.

The electrical circuit for operating the electrode feeding motor is connected, of course, to the armature of an arc unit exciter or other direct current source as indicated. For influencing the operation of the electrode feeding motor we have provided two circuits of different impedance receiving energy from a source or sources influenced by the arc circuit. We have found it preferable that one circuit have a high inductance and the other a high capacitance. Evidently when the frequency is low feeble current will flow in the circuit containing capacity while a strong current will exist in the circuit containing inductance.

The circuits include a balanced type frequency relay 12 having a central pivotal lever 14, oscillation of which is produced through the medium of two electromagnets 15 and 16. The magnet 16 is connected in series with an inductance across the arc stabilizing impedance, while the magnet 15 is connected in series with a condenser 17 across the arc circuit. It is obvious, however, that it will be effective to reverse this order of the disposition of the magnets or to connect both magnet circuits either across the arc or across the stabilizing impedance. Stops 18 limit the amount of oscillation permitted the lever 14 and the latter is connected with a damper 19 in order that it will respond to mean values rather than individual impulses.

In operation during the period that normal arc potential exists, the condenser circuit will pass a charging current. When the arc is short circuited by a globule bridging the arc gap, the current in this circuit will reverse and the condenser will discharge its energy through the short circuit path provided by the globule. It will be evident from this that the mean effective current which exists in this circuit will increase with the frequency of short circuits.

The magnet 16 connected as it is in series with an inductance receives a pulsating current due to the varying reactive drop which occurs across the stabilizer. This potential will be out of phase with the potential across the arc for it is clear that during the period of arc short circuit, almost the entire potential of the generator exists across the stabilizer; and conversely, when the arc is not bridged by a globule, there is very little drop occurring across the stabilizer. This phase displacement is compensated for by the inherent characteristics of the inductance and capacity.

The mean effective voltage across the stabilizer will increase as the frequency of short circuits increases but due to the inductive nature of the circuit to which it is applied, the current will remain approximately constant. Therefore, the attraction of the magnet 16 for the lever 14 will remain substantially constant while the attraction of the magnet 15 for the lever will increase with the frequency of short circuits.

It is apparent that the relay is substantially independent of the voltage existing in the circuit because an increase or decrease in voltage effects both sides equally.

We may adjust the balance by means of a resistance in either operating circuit or by an adjustable weight on the lever 14.

As shown in the drawing we utilize the relay to periodically short circuit a resistance in series with the armature of the electrode feeding motor by means of the stops or contacts 18, which are so adjusted as to open a parallel path through the resistance when the arc is short and to close the same when the arc is long. However, it is to be understood that it is within the scope of the present invention to utilize the frequency of the short circuits set up by the frequency of the depositions between the electrodes to influence the operation of the electrode feed motor in any other manner.

It is thus obvious that as the arc lengthens, the rate of feed of the electrode material will be increased; and as the arc decreases in length, the rate of feed of the electrode material will be decreased and so the arc length will be maintained substantially constant.

While we have disclosed one embodiment of our invention, it will be apparent that various changes may be made therein without departing from the spirit and scope of the invention as defined in the appended claims.

Having thus described our invention, what we claim and desire to secure by Letters Patent is:

1. In electric welding apparatus, the combination of an electrode disposed adjacent to the work and arranged to have an arc established therebetween for globules of electrode material at the arcing end of said electrode to be deposited on the work, means for feeding said electrode to the work, and means operable in accordance with changes from a predetermined normal rate at which the electrode globules are deposited on the work for varying the rate of feeding of said electrode to the work.

2. In electric welding apparatus, the combination of an electrode disposed adjacent to the work and arranged to have an arc established therebetween for globules of electrode material at the arcing end of said electrode to be deposited on the work, means including an electrical device for feeding said electrode to the work, and means associated with said electrical device and responsive to changes from a predetermined normal rate at which the electrode globules are deposited on the work for varying the rate of feeding of said electrode to the work.

3. In electric welding apparatus, the combination of an electrode disposed adjacent to the work and arranged to have an arc established therebetween so that globules of electrode material formed at the arcing end of said electrode will bridge the arc and be deposited on the work, means including an electric motor having a circuit for feeding said electrode to the work, a resistance connected in said circuit, and means including a condenser responsive to changes from a predetermined normal rate at which the electrode globules bridge the arc and are deposited on the work for shunting said resistance so as to vary the rate of feeding of said electrode to the work.

4. In electric welding apparatus, the combination of an electrode disposed adjacent to the work and arranged to have an arc established therebetween so that globules of electrode material formed at the arcing end of said electrode will bridge the arc and be deposited on the work, means including an electric motor having a circuit for feeding said electrode to the work, and control means including a condenser connected across the arc and operable in accordance with changes from a predetermined normal rate at which the electrode globules bridge the arc and are deposited on the work for changing a condition of said motor circuit for varying the rate of feeding of said electrode to the work.

5. In electric welding apparatus, the combination of an electrode disposed adjacent to the work and arranged to have an arc established therebetween so that globules of electrode material formed at the arcing end of said electrode will bridge the arc and be deposited on the work to intermittently short circuit the arc, means for feeding said electrode to the arc, and means associated with said feeding means and connected to be effected by the intermittent short circuiting of the arc and comprising a circuit including a condenser and inductive reactance for varying the rate of feeding of said electrode to the work with changes from a predetermined normal rate at which the electrode globules bridge the arc and are deposited on the work.

6. In welding apparatus, the combination of a welding circuit including cooperating electrodes arranged to have an arc established therebetween so that globules of electrode material formed at the end of one of said electrodes will bridge the arc gap and subsequently separate therefrom, means for feeding to the arc said electrode at which globules are formed, and means operable in accordance with changes in the normal predetermined rate at which the electrode globules are formed and bridge the arc gap for controlling said feeding means.

7. In welding apparatus, the combination of a welding circuit including the work and an electrode arranged to have an arc established therebetween, said electrode and the work normally being sufficiently close together for globules of electrode material to form at the arcing end of said electrode and bridge the arc gap and be deposited on the work to cause voltage fluctuations in said welding circuit, means including an electrical translating device for feeding said electrode to the work, and means operable in accordance with changes from a normal predetermined frequency of voltage fluctuations in said welding circuit for controlling said electrical device.

8. In welding apparatus, the combination of a welding circuit including the work and an electrode arranged to have an arc established therebetween, said electrode and the work normally being sufficiently close together for globules of electrode material formed at the arcing end of said electrode to bridge the arc and be deposited on the work to cause voltage fluctuations in said welding circuit, means for feeding said electrode to the work, and means comprising a circuit including a condenser responsive to the frequency of voltage fluctuations in said welding circuit for controlling said feeding means.

9. In welding apparatus, the combination of a welding circuit including the work and an electrode arranged to have an arc established therebetween, said electrode and the work normally being sufficiently close together for globules of electrode material formed at the arcing end of said electrode to bridge the arc and be deposited on the work to cause voltage fluctuations in said welding circuit, means including an electrical translating device having a circuit for feeding said electrode to the work, and means including a condenser responsive to changes in the frequency of voltage fluctuations in said welding circuit for controlling a condition of the circuit of said electrical translating device.

10. In welding apparatus, the combination of a welding circuit including the work and an electrode arranged to have an arc established therebetween so that globules of electrode material formed at the arcing end of said electrode will be deposited on the work, means comprising an electrical translating device provided with a control circuit including a resistor having a relay in shunt therewith for feeding said electrode to the work, and means including a condenser connected to be responsive to changes from a predetermined normal rate at which the electrode globules are deposited on the work for controlling said relay.

11. In welding apparatus, the combination of a welding circuit including the work and an electrode arranged to have an arc established therebetween, said electrode and the work normally being sufficiently close together for globules of electrode material formed at the arcing end of said electrode to bridge the arc and be deposited on the work to cause voltage fluctuations in said welding circuit, means for feeding said electrode to the work, and means substantially independent of the average voltage in said welding circuit and operable in accordance with changes from a predetermined normal frequency of the voltage fluctuations in said welding circuit for controlling said feeding means.

12. In welding apparatus, the combination of a welding circuit including the work and an electrode arranged to have an arc established therebetween, said electrode and the work normally being sufficiently close together for globules of electrode material formed at the arcing end of said electrode to short circuit the arc and be deposited on the work to cause voltage fluctuations in said welding circuit, means for feeding said electrode to the work, means operable in accordance with the frequency of voltage fluctuations in said welding circuit for controlling said feeding means, said last-mentioned means including a relay comprising a movable armature and a plurality of energizing coils therefor connected to said welding circuit and arranged in opposed relation with respect to said armature, one of said energizing coils having a condenser connected in series relation therewith.

13. In welding apparatus, the combination of a welding circuit comprising a stabilizing impedence and an electrode and including the work, said electrode and the work being arranged to have an arc established therebetween for globules of electrode material at the arcing end of said electrode to short circuit the arc and be deposited on the work to cause voltage fluctuations in said welding circuit, means for feeding said electrode to the work, means operable in accordance with the frequency of voltage fluctuations in said welding circuit for controlling said feeding means, said last-mentioned means including a relay comprising a movable armature and a plurality of energizing coils therefor arranged in opposed relation with respect to said armature, one of said coils being connected across said stabilizing impedance and the other of said coils having a condenser in series relation therewith and being connected across the arc.

14. In welding apparatus, the combination of an arc circuit including the work and a welding rod, the welding rod and the work normally being sufficiently close together so that globules of welding rod material formed at the arcing end of the welding rod will be deposited on the work; electrocally operable means for feeding the welding rod toward the work; a control circuit associated with said electrically operable means; and means included in said control circuit and responsive to the rate of globular deposition of welding rod material on the work for controlling said feeding means to maintain the rate of deposition of the globules substantially constant.

HARRY E. KENNEDY.
MAYNARD A. ROTERMUND.
LLOYD T. JONES.